United States Patent
Li et al.

(10) Patent No.: US 8,144,930 B2
(45) Date of Patent: Mar. 27, 2012

(54) SYSTEMS AND METHODS FOR TRACKING IMAGES

(75) Inventors: Shuo Li, London (CA); Ismail Ben Ayed, London (CA); Ian Ross, London (CA); Richard Rankin, Denfield (CA)

(73) Assignee: General Electric Company, Schenectady, NY (US)

( * ) Notice: Subject to any disclaimer, the term of this patent is extended or adjusted under 35 U.S.C. 154(b) by 702 days.

(21) Appl. No.: 12/325,226

(22) Filed: Nov. 30, 2008

(65) Prior Publication Data
US 2010/0135529 A1   Jun. 3, 2010

(51) Int. Cl.
*G06K 9/00* (2006.01)
(52) U.S. Cl. ........ 382/103; 382/128; 382/173; 382/209; 382/284
(58) Field of Classification Search .................. 382/103, 382/128, 173, 209, 284
See application file for complete search history.

(56) References Cited

OTHER PUBLICATIONS

Freedman, Daniel, et al., "Active Contours for Tracking Distributions," IEEE Transactions on Image Processing, vol. 13, No. 4, Apr. 2004.
Michailovich, Oleg, et al., "Image Segmentation Using Active Countours Driven by the Bhattacharyya Gradient Flow," IEEE Transactions on Image Processing, vol. 16, No. 11, Nov. 2007.
Zhang, Tao, et al., "Improving Performance of Distribution Tracking through Background Mismatch," IEEE Transactions on Pattern Analysis and Machine Intelligence, vol. 27, No. 2, Feb. 2005.

*Primary Examiner* — Tony Ko
(74) *Attorney, Agent, or Firm* — McAndrews, Held & Malloy, Ltd.; Amando Pastrana, Jr.

(57) ABSTRACT

Image tracking as described herein can include: segmenting a first image into regions; determining an overlap of intensity distributions in the regions of the first image; and segmenting a second image into regions such that an overlap of intensity distributions in the regions of the second image is substantially similar to the overlap of intensity distributions in the regions of the first image. In certain embodiments, images can depict a heart at different points in time and the tracked regions can be the left ventricle cavity and the myocardium. In such embodiments, segmenting the second image can include generating first and second curves that track the endocardium and epicardium boundaries, and the curves can be generated by minimizing functions containing a coefficient based on the determined overlap of intensity distributions in the regions of the first image.

20 Claims, 5 Drawing Sheets

SYSTEMS AND METHODS FOR TRACKING IMAGES

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND

Tracking images over time can provide useful information regarding the state and/or changes of an item(s) depicted in the images. Tracking anatomy, such as the left ventricle of the heart, for example, can aid in the diagnosis of cardiovascular disease.

Cardiovascular disease is a leading cause of death in the western world, which can contribute to increasing personal, community and health care costs. Modern imaging techniques, such as Magnetic Resonance Imaging (MRI) and Commuted Tomography (CT), for example, have been recognized as enabling assessment of the presence and extent of cardiovascular disease. Tracking a left ventricle over time can include segmenting images into three target regions: the left ventricle cavity, the myocardium and background. This can be difficult because: (1) there is overlap in intensity distributions among the specified regions; (2) the myocardium and papillary muscles are connected and have almost the same intensity; (3) the left ventricle cavity has an intensity distribution similar to the right ventricle; (4) there are no boundaries between the epicardium and some cardiac regions; (5) there are substantial size, shape and intensity variations among subjects. Certain known methods of tracking the left ventricle that utilize geometric constraints based on finite data sets and/or intensity-driven constraints assume that a distribution overlap within different regions should be minimized. However, such methods can provide erroneous results, for example, that include papillary muscles in the myocardium and/or include background in a tracked region. Also, tracking the left ventricle manually can be quite time consuming, and other methods are not suitable for use in a clinical environment.

Images used in connection with tracking anatomy can be created and/or maintained as part of an information system. Healthcare environments, such as hospitals or clinics, include information systems, such as hospital information systems (HIS), radiology information systems (RIS), clinical information systems (CIS), and cardiovascular information systems (CVIS), and storage systems, such as picture archiving and communication systems (PACS), library information systems (LIS), and electronic medical records (EMR). Information stored may include patient medical histories, imaging data, test results, diagnosis information, management information, and/or scheduling information, for example. The information may be centrally stored or divided at a plurality of locations. Healthcare practitioners may desire to access patient information or other information at various points in a healthcare workflow. For example, during and/or after surgery, medical personnel may access patient information, such as images of a patient's anatomy, that are stored in a medical information system. Radiologists, cardiologists and/or other clinicians may review stored images and/or other information, for example.

Using a PACS and/or other workstation, a clinician, such as a radiologist or cardiologist, for example, may perform a variety of activities, such as an image reading, to facilitate a clinical workflow. A reading, such as a radiology or cardiology procedure reading, is a process of a healthcare practitioner, such as a radiologist or a cardiologist, viewing digital images of a patient. The practitioner performs a diagnosis based on a content of the diagnostic images and reports on results electronically (for example, using dictation or otherwise) or on paper. The practitioner, such as a radiologist or cardiologist, typically uses other tools to perform diagnosis. Some examples of other tools are prior and related prior (historical) exams and their results, laboratory exams (such as blood work), allergies, pathology results, medication, alerts, document images, and other tools. For example, a radiologist or cardiologist typically looks into other systems such as laboratory information, electronic medical records, and healthcare information when reading examination results.

There is a need for improved systems, methods and computer instructions for tracking images over time.

BRIEF SUMMARY

Certain embodiments of the present technology provide systems, methods and computer instructions for tracking images.

In certain embodiments, for example, a method for tracking images includes: segmenting a first image into a first region and a second region; determining an overlap of intensity distributions in the first region and the second region; and segmenting a second image into a third region and a fourth region such that an overlap of intensity distributions in the third region and the fourth region are substantially similar to the overlap of intensity distributions in the first region and the second region.

In certain embodiments, for example, a system for tracking images includes: an input module configured to input a first image that has been segmented into a first region and a second region; and a processor operably connected with the input module, wherein the processor is configured to determine an overlap of intensity distributions in the first region and the second region, and wherein the processor is configured to segment a second image into a third region and a fourth region such that an overlap of intensity distributions in the third region and the fourth region are substantially similar to the overlap of intensity distributions in the first region and the second region.

In certain embodiments, for example, a computer-readable storage medium including a set of instructions for execution on a processing device and associated processing logic for tracking images includes: a routine that allows the input of a first image that has been segmented into a first region and a second region; a routine that allows determination of an overlap of intensity distributions in the first region and the second region; and a routine that allows segmentation of a second image into a third region and a fourth region such that an overlap of intensity distributions in the third region and the fourth region are substantially similar to the overlap of intensity distributions in the first region and the second region.

Figure 1:
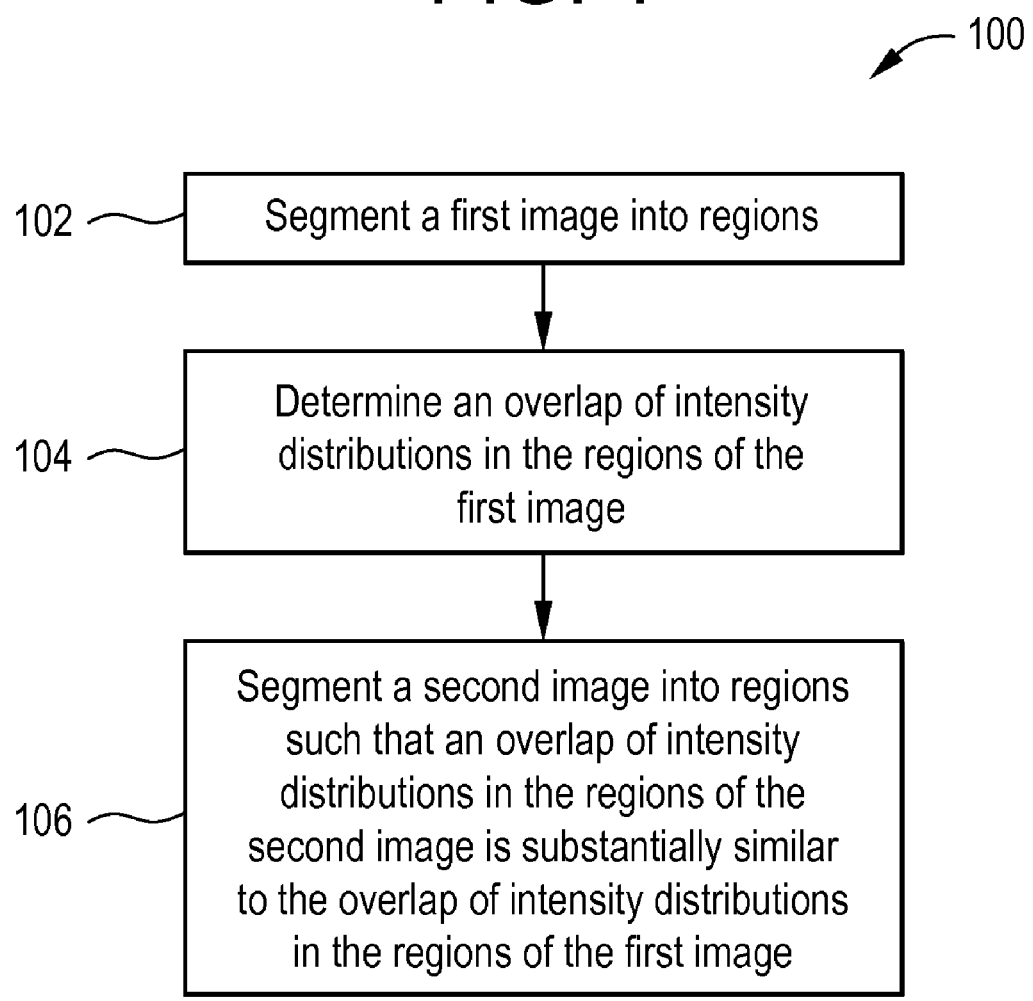
FIG. 1 is a flow diagram that illustrates a method used in accordance with an embodiment of the present technology.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Certain embodiments of the present technology provide systems, methods and computer instructions for tracking images. Certain embodiments provide for tracking heart images, and specifically for tracking the left ventricle cavity and the myocardium over time in a series of images. Nonetheless, the inventions described herein are not limited to tracking images of the heart, and can be employed in many applications, as will be evident to those skilled in the art.

FIG. 1 is a flow diagram that illustrates a method 100 used in accordance with an embodiment of the present technology. At 102, a first image is segmented into regions. In certain embodiments, the first image can be segmented manually or automatically. In certain embodiments, an image can be segmented into any number of regions.

Figure 2:
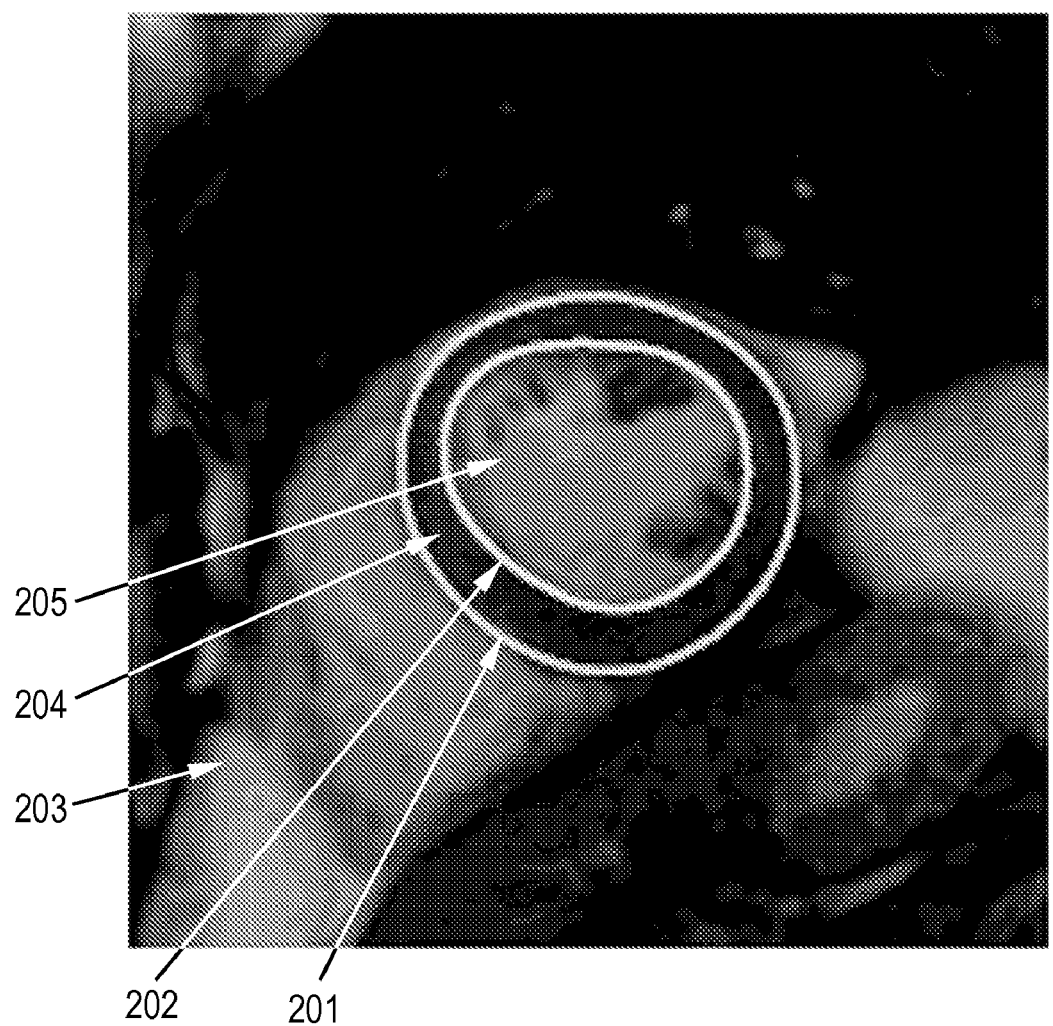
FIG. 2 depicts a segmented image in accordance with an embodiment of the present technology.

In certain embodiments, an image of a heart can be segmented into three regions as shown in FIG. 2. The regions shown in FIG. 2 are the left ventricle cavity 205, which is the area inside the line 202 (depicting the endocardium boundary), the myocardium 204, which is the area between the line 201 (depicting the epicardium boundary) and the line 202 (depicting the endocardium boundary), and background 203, which is everything outside the line 201 (depicting the epicardium boundary).

At 104, an overlap of intensity distributions in the regions of the first image is determined. In certain embodiments, such a determination can be made by computing the number of times any number of photometric values (for example, relating to brightness and/or color) appear in each region.

Figure 3:
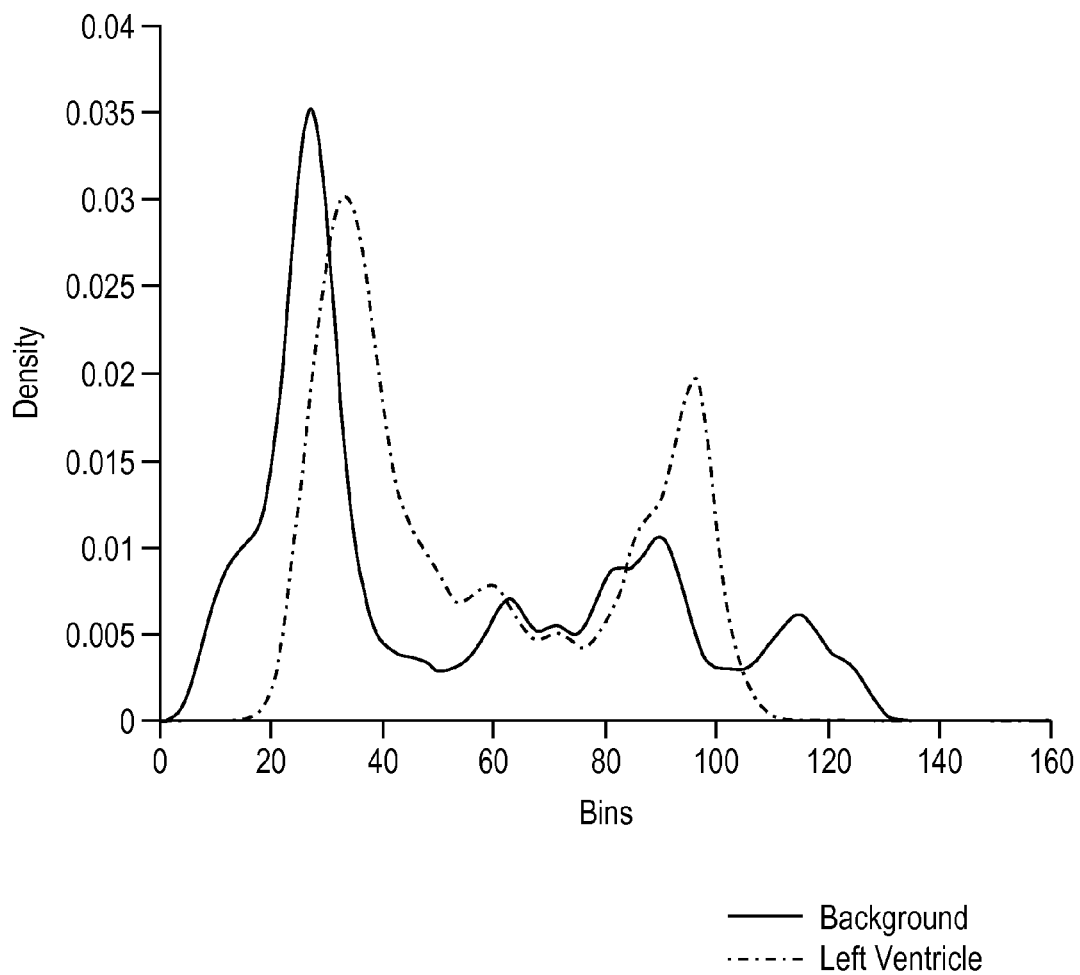
FIG. 3 is a diagram depicting overlap of intensity distributions in regions of the segmented image of FIG. 2.
Figure 4:
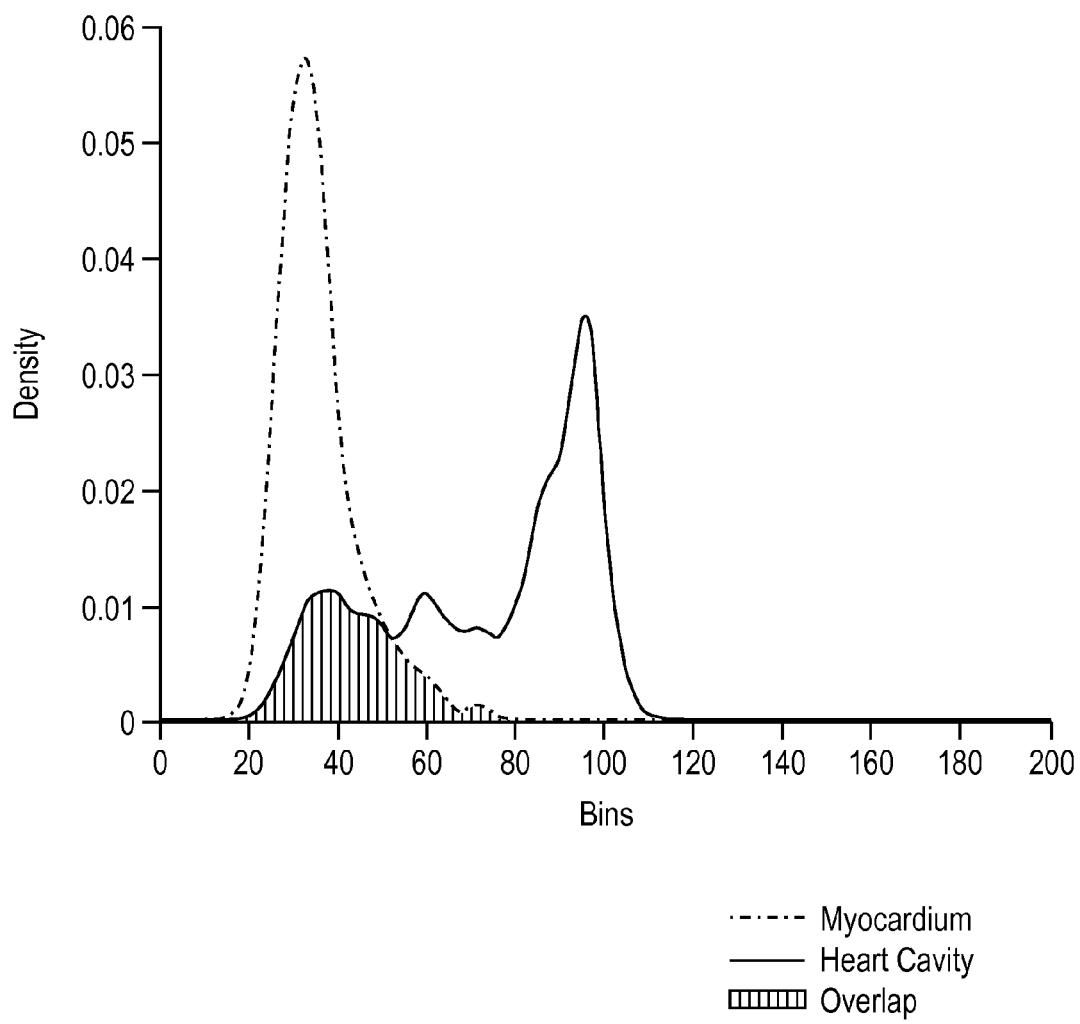
FIG. 4 is a diagram depicting overlap of intensity distributions in regions of the segmented image of FIG. 2.

Overlap information for the embodiment shown in FIG. 2 is depicted in FIGS. 3 and 4. FIG. 3 depicts the overlap of intensity distributions (by density) between the left ventricle cavity 205 and the background 203. FIG. 4 depicts the overlap of intensity distributions (by density) between the left ventricle cavity 205 and the myocardium 204.

At 106, a second image is segmented into regions such that an overlap of intensity distributions in the regions of the second image is substantially similar to the overlap of intensity distributions in the regions of the first image. In certain embodiments, a second image can be segmented into regions such that the overlap of intensity distributions in the regions of the second image is the same as the overlap of intensity distributions in the regions of the first image.

In certain embodiments, the first and second images depict the same anatomy at different points in time. In certain embodiments, the anatomy is a heart, and segmenting the second image includes generating a first curve that tracks the endocardium boundary (202 in FIG. 2) and a second curve that tracks the epicardium boundary (201 in FIG. 2), wherein the curves are generated by minimizing functions that contain a coefficient based on the determined overlap of intensity distributions in the regions of the first image. Mathematical computations for function minimization and determination of an overlap coefficient as applied in the cardiac embodiment are discussed below. However, the inventions described herein are not limited to tracking images of the heart, and can be employed in many applications, as will be evident to those skilled in the art.

In the equations, $\mathcal{I}$ represents a sequence of cardiac images (such as magnetic resonance images, for example) containing N frames (for example, about 20 to 25 frames), $I^n$: $\Omega \subset \mathbb{R}^2 \to \mathbb{R}^+$, $n \in [1 \ldots N]$. In order to automatically segment each image after the first image (that is, to generate a first curve that tracks the endocardium boundary (202 in FIG. 2) and a second curve that tracks the epicardium boundary (201 in FIG. 2)), two closed planar parametric curves are generated, by evolving the curves, $\Gamma_{in}^n(s)$, $\Gamma_{out}^n(s):[0,1] \to \Omega$, toward, respectively, the endocardium boundary and the epicardium boundary. The equations can aid in segmenting an image into three regions: (1) the heart cavity $C^n$, which corresponds with the interior of curve $\Gamma_{in}^n$: $C^n = R_{\Gamma_{in}^n}$; (2) the myocardium $M^n$, which corresponds to the region between $\Gamma_{in}^n$ and $\Gamma_{out}^n$: $M^n = R_{\Gamma_{in}^n}^c \cap R_{\Gamma_{out}^n}$; and (3) the background $B^n$, which corresponds to the region outside $\Gamma_{out}^n$: $B^n = R_{\Gamma_{out}^n}^c$.

For each $R \in \{C^n, M^n, B^n, n=1 \ldots N\}$, $P_{R,I}$ is defined as the nonparametric (kernel-based) estimate of the intensity distribution within region R in frame $I \in \{I^n, n=1 \ldots N\}$ such that:

$$\forall_z \in \mathbb{R}^+, P_{R \cdot I}(z) = \frac{\int_R K(z - I(x)) dx}{a_R},$$

where $^a R$ is the area of region R: $^a R = \int_R dx$. In certain embodiments, K can be the Dirac delta function or the Gaussian kernel.

The amount of overlap between two samples f and g can be defined as the Bhattacharyya coefficient $\mathcal{B}(f/g)$ (between 0 and 1 where 0 indicates no overlap and 1 indicates complete overlap). The equation is:

$$\mathcal{B}(f/g) = \sum_{z \in \mathbb{R}^+} \sqrt{f(z)g(z)}.$$

A first image, such as the first frame $I^1$, for example, can be segmented manually or automatically to provide a given $\{C^1, M^1, B^1\}$, providing the equation: $B_{in}^n = \mathcal{B}(P_{C^n, I^n}/P_{M^1, I^1})$; $B_{out}^n = \mathcal{B}(P_{M^n, I^n}/P_{B^1, I^1}) \forall n \in [1 \ldots N]$, where $B_{in}^n$ measures the overlap between the intensity distributions within the left ventricle cavity and the myocardium in $I^n$, and $B_{out}^n$ measures the overlap between the intensity distributions within the myocardium and the background in $I^n$. The result is that $B_{in}^n$ and $B_{out}^n$ can be approximately constant over a cardiac sequence, which has been confirmed through experimentation. $B_{in}^1$ and $B_{out}^1$ from a given segmentation of the first frame in a sequence $\mathcal{I}$ can be used to track the anatomy in frames $I^2 \ldots I^N$.

Next a two-step curve evolution for each $n \in [2 \ldots N]$ is provided. The endocardium boundary, $\Gamma_{in}^n$, is generated by minimization of the equation:

$$\mathcal{F}_{in}^n = \underbrace{\alpha(B_{in}^n - B_{in}^1)^2}_{\text{Overlap cavity/myocardium}} + \underbrace{\beta(\mu_{in}^n - \mu_{in}^1)^2}_{\text{Cavity mean}} + \lambda \underbrace{\oint_{\Gamma_{in}^n} (g_n + c)ds}_{\text{Endocardium boundary}},$$

where $\mu_{in}^n$ is the estimate of intensity mean within $C_{in}^n$ for $n \in [1 \ldots N]$:

$$\mu_{in}^n = \frac{\int_{C^n} I^n dx}{aC^n}, \quad g_n = \frac{1}{1 + \|\nabla I^n\|^2}$$

is an edge indicator function that biases the curve toward a high gradient of intensity and c is a constant to enforce curve smoothness. $\alpha$, $\beta$ and $\lambda$ are positive real constants to balance the contribution of each term.

The epicardium boundary, $\Gamma_{out}$, is generated by minimization of the equation:

$$\mathcal{F}_{out}^n = \underbrace{\alpha(B_{out}^n - B_{out}^1)^2}_{\text{Overlap myocardium/background}} + \underbrace{\beta(\mu_{out}^n - \mu_{out}^1)^2}_{\text{Myocardium mean}} + \lambda \underbrace{\oint_{\Gamma_{out}^n} (g_n + c)ds}_{\text{Epicardium boundary}},$$

where $\mu_{out}^n$ is the estimate of intensity mean within $M_{in}^n$ for $$n \in [1 \ldots N]: \quad \mu_{out}^n = \frac{\int_{M^n} I^n dx}{aM^n}$$

The usefulness of the proposed terms has been confirmed experimentally by comparing the results with manual segmentations.

Curve evolutions can be obtained by the Euler-Lagrange descent equations. Each curve, $\Gamma \in \{\Gamma_{in}^n, \Gamma_{out}^n\}$, can be embedded in a one-parameter family of curves: $\Gamma(s,t):[0,1] \times R^+ \to \Omega$, and the partial differential equations, $$\frac{\partial \Gamma_{in}^n(s, t)}{\partial t} = -\frac{\partial \mathcal{F}_{in}^n}{\partial \Gamma_{in}^n}, \quad \frac{\partial \Gamma_{out}^n(s, t)}{\partial t} = -\frac{\partial \mathcal{F}_{out}}{\partial \Gamma_{out}^n},$$

are solved. After some algebraic manipulations, the final curve evolution equations are:

$$\frac{\partial \Gamma_{in}^n}{\partial t} = \left\{ \frac{\alpha(B_{in}^n - B_{in}^1)}{aC^n}\left(B_{in}^n - \sqrt{\frac{P_{M^1,I^1}}{P_{C^n,I^n}}}\right) + \right.$$

$$\left. \frac{2\beta(\mu_{in}^n - \mu_{in}^1)}{aC^n}(\mu_{in}^n - I^n) + \lambda[\nabla g_n \cdot n_{in}^n - (g_n + c)\kappa_{in}^n] \right\} n_{in}^n$$

$$\frac{\partial \Gamma_{out}^n}{\partial t} = \left\{ \frac{(B_{out}^n - B_{out}^1)}{aM^n}\left(B_{out}^n - \sqrt{\frac{P_{B^1,I^1}}{P_{M^n,I^n}}}\right) + \right.$$

$$\left. \frac{2\beta(\mu_{out}^n - \mu_{out}^1)}{aM^n}(\mu_{out}^n - I^n) + \lambda[\nabla g_n \cdot n_{out}^n - (g_n + c)\kappa_{out}^n] \right\} n_{out}^n$$

where $n_{in}^n$ and $n_{out}^n$ are outward unit normals to $\Gamma_{in}^n$ and $\Gamma_{out}^n$, respectively, and $K_{in}^n$ and $K_{out}^n$ are mean curvature functions to $\Gamma_{in}^n$ and $\Gamma_{out}^n$, respectively. Segmentation ($C^n$, $M^n$, $B^n$) of frame $I^n$ is obtained $\Gamma_{in}^n$ and $\Gamma_{out}^n$ at convergence, when $t \to \infty$. The level-set framework is used to implement the evolution equations.

Determination of an overlap coefficient and function minimization, as described above, can provide for automatic segmentation of a second image into regions such that an overlap of intensity distributions in the regions of the second image is substantially similar (or the same) as the overlap of intensity distributions in the regions of another image.

The equations above describe subsequent images in a sequence being segmented based on a given segmentation of the first image in the sequence. Nonetheless, in certain embodiments, subsequent and/or prior images in a sequence can be segmented based on a given segmentation of any other image in the sequence. Further, the computations above are applied in a cardiac context, however, the inventions described herein are not limited to tracking images of the heart, and can be employed in many applications, as will be evident to those skilled in the art.

In certain embodiments, segmenting a plurality of images of the same element over time as described above can aid in analysis of the element. Such methods can be flexible and valuable, for example, by being implemented without: (1) prior information regarding the shape of the element; (2) making assumptions as to parametric distributions of intensity and/or shape data; and (3) requiring explicit boundary coupling. The third benefit is based on implicit boundary coupling that can be achieved from function minimization, for example, as described above.

One or more of the steps of the method 100 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present technology are directed to systems for tracking images that can function in accordance with the method 100 described in connection with FIG. 1. In certain embodiments, such systems can include: an input module configured to input a first image that has been segmented into regions; and a processor operably connected with the input module, wherein the processor is configured to determine an overlap of intensity distributions in the regions of the first image, and wherein the processor is configured to segment a second image into regions such that an overlap of intensity distributions in the regions of the second image is substantially similar to the overlap of intensity distributions in the regions of the first image. In certain embodiments, such a system can be implemented in connection with a clinical information system, as described below.

Certain embodiments of the present technology are directed to computer-readable storage mediums including sets of instructions for execution on a processing device and associated processing logic for tracking images in accordance with the method 100 described above in connection with FIG. 1. In certain embodiments, such mediums and instructions can include a routine that allows the input of a first image that has been segmented into regions; a routine that allows determination of an overlap of intensity distributions in the regions of the first image; and a routine that allows segmentation of a second image into regions such that an overlap of intensity distributions in the regions of the second image is substantially similar to the overlap of intensity distributions in the regions of the first image. In certain embodiments, such a medium and instructions can be implemented in connection with a clinical information system, as described below.

Figure 5:
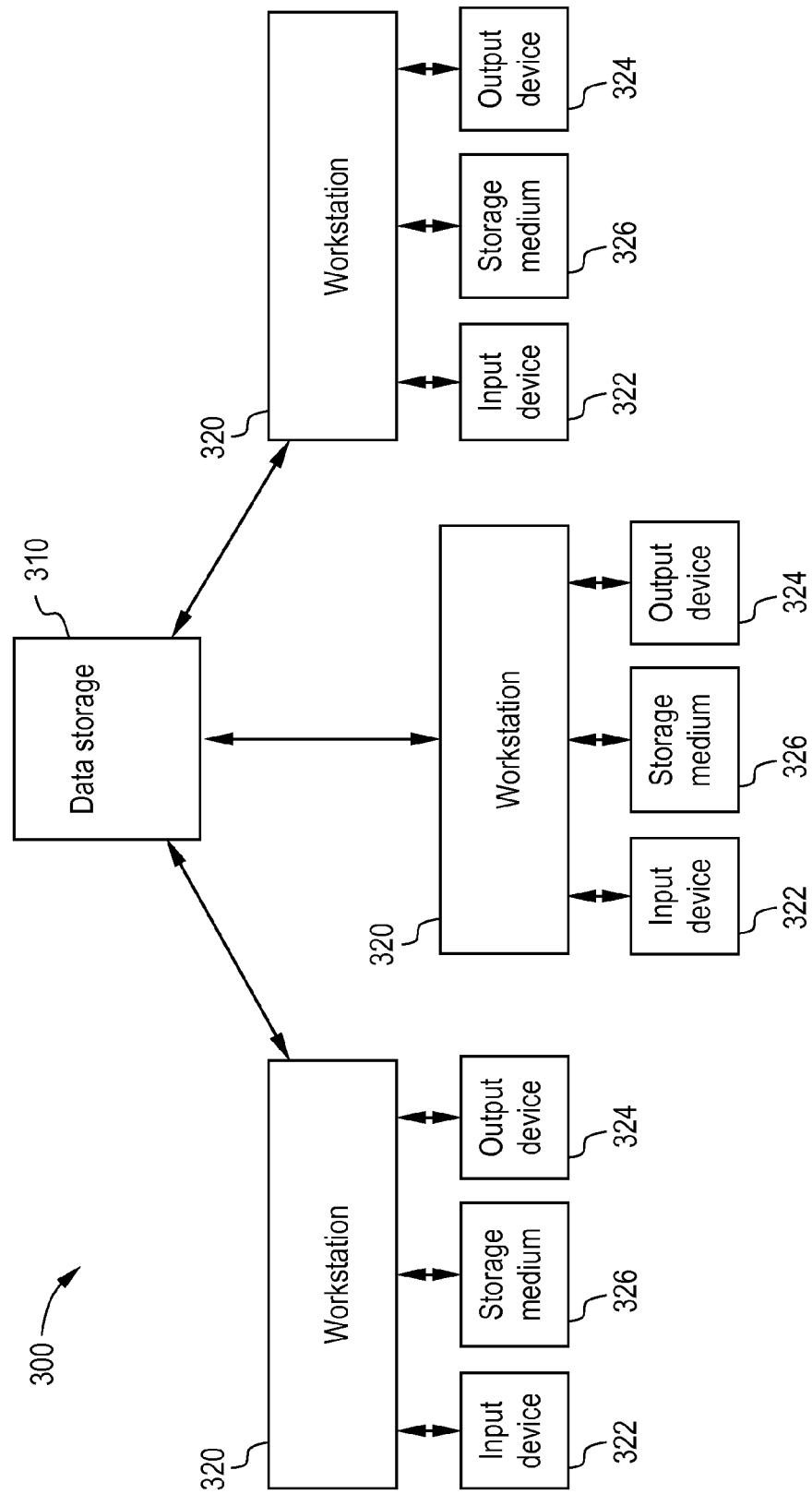
FIG. 5 depicts a system used in accordance with an embodiment of the present technology.

Certain embodiments of the method 100 described above can be implemented on a clinical information system, such as the system 300 of FIG. 5. In certain embodiments, an interface including patient information and images may be viewed and/or constructed using a system such as system 300 including at least one data storage 310 and at least one workstation 320. While three workstations 320 are illustrated in system 300, a larger or smaller number of workstations 320 can be used in accordance with embodiments of the presently described technology. In addition, while one data storage 310 is illustrated in system 300, system 300 can include more than one data storage 310. For example, each of a plurality of entities (such as remote data storage facilities, hospitals or clinics) can each include one or more data stores 310 in communication with one or more workstations 320.

As illustrated in system 300, one or more workstations 320 can be in communication with at least one other workstation 320 and/or at least one data storage 310. Workstations 320 can be located in a single physical location or in a plurality of locations. Workstations 320 can be connected to and communicate via one or more networks.

Workstations 320 can be directly attached to one or more data stores 310 and/or communicate with data storage 310 via one or more networks. Each workstation 320 can be implemented using a specialized or general-purpose computer executing a computer program for carrying out the processes described herein. Workstations 320 can be personal computers or host attached terminals, for example. If workstations 320 are personal computers, the processing described herein can be shared by one or more data stores 310 and a workstation 320 by providing an applet to workstation 320, for example.

Workstations 320 include an input device 322, an output device 324 and a storage medium 326. For example, workstations 320 can include a mouse, stylus, microphone and/or keyboard as an input device. Workstations 320 can include a computer monitor, liquid crystal display ("LCD") screen, printer and/or speaker as an output device.

Storage medium 326 of workstations 320 is a computer-readable memory. For example, storage medium 326 can include a computer hard drive, a compact disc ("CD") drive, a USB thumb drive, or any other type of memory capable of storing one or more computer software applications. Storage medium 326 can be included in workstations 320 or physically remote from workstations 320. For example, storage medium 326 can be accessible by workstations 320 through a wired or wireless network connection.

Storage medium 326 includes a set of instructions for a computer. The set of instructions includes one or more routines capable of being run or performed by workstations 320. The set of instructions can be embodied in one or more software applications or in computer code.

Data storage 310 can be implemented using a variety of devices for storing electronic information such as a file transfer protocol ("FTP") server, for example. Data storage 310 includes electronic data. For example, data storage 310 can store patient exam images and/or other information, electronic medical records, patient orders, etc., for a plurality of patients. Data storage 310 may include and/or be in communication with one or more clinical information systems, for example.

Communication between workstations 320, workstations 320 and data storage 310, and/or a plurality of data stores 310 can be via any one or more types of known networks including a local area network ("LAN"), a wide area network ("WAN"), an intranet, or a global network (for example, Internet). Any two of workstations 320 and data stores 310 can be coupled to one another through multiple networks (for example, intranet and Internet) so that not all components of system 300 are required to be coupled to one another through the same network.

Any workstations 320 and/or data stores 310 can be connected to a network or one another in a wired or wireless fashion. In an example embodiment, workstations 320 and data store 310 communicate via the Internet and each workstation 320 executes a user interface application to directly connect to data store 310. In another embodiment, workstation 320 can execute a web browser to contact data store 310. Alternatively, workstation 320 can be implemented using a device programmed primarily for accessing data store 310.

Data storage 310 can be implemented using a server operating in response to a computer program stored in a storage medium accessible by the server. Data storage 310 can operate as a network server (often referred to as a web server) to communicate with workstations 320. Data storage 310 can handle sending and receiving information to and from workstations 320 and can perform associated tasks. Data storage 310 can also include a firewall to prevent unauthorized access and enforce any limitations on authorized access. For instance, an administrator can have access to the entire system and have authority to modify portions of system 300 and a staff member can only have access to view a subset of the data stored at data store 310. In an example embodiment, the administrator has the ability to add new users, delete users and edit user privileges. The firewall can be implemented using conventional hardware and/or software.

Data store 310 can also operate as an application server. Data store 310 can execute one or more application programs to provide access to the data repository located on data store 310. Processing can be shared by data store 310 and workstations 320 by providing an application (for example, a java applet). Alternatively, data store 310 can include a stand-alone software application for performing a portion of the processing described herein. It is to be understood that separate servers may be used to implement the network server functions and the application server functions. Alternatively, the network server, firewall and the application server can be implemented by a single server executing computer programs to perform the requisite functions.

The storage device located at data storage 310 can be implemented using a variety of devices for storing electronic information such as an FTP server. It is understood that the storage device can be implemented using memory contained in data store 310 or it may be a separate physical device. The storage device can include a variety of information including a data warehouse containing data such as patient medical data, for example.

Data storage 310 can also operate as a database server and coordinate access to application data including data stored on the storage device. Data storage 310 can be physically stored as a single database with access restricted based on user characteristics or it can be physically stored in a variety of databases.

In an embodiment, data storage 310 is configured to store data that is recorded with or associated with a time and/or date stamp. For example, a data entry can be stored in data storage 310 along with a time and/or date at which the data was entered or recorded initially or at data storage 310. The time/date information can be recorded along with the data as, for example, metadata. Alternatively, the time/date information can be recorded in the data in manner similar to the remainder of the data. In another alternative, the time/date information can be stored in a relational database or table and associated with the data via the database or table.

In an embodiment, data storage 310 is configured to store image and/or other medical data for a patient. The medical data can include data such as numbers and text. The medical data can also include information describing medical events. For example, the medical data/events can include a name of a medical test performed on a patient. The medical data/events can also include the result(s) of a medical test performed on a patient. For example, the actual numerical result of a medical test can be stored as a result of a medical test. In another example, the result of a medical test can include a finding or analysis by a caregiver that entered as text.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

Certain embodiments include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for tracking images using a computer comprising:
    performing by at least one computer processing device, least:
        segmenting a first image into a first region and a second region;
        determining an overlap of intensity distributions in the first region and the second region; and
        segmenting a second image into a third region and a fourth region such that an overlap of intensity distributions in the third region and the fourth region is substantially similar to the overlap of intensity distributions in the first region and the second region.

2. The method of claim 1, wherein the first image is segmented at least one of manually and automatically.

3. The method of claim 1, wherein the overlap of intensity distributions in the third region and the fourth region is the same as the overlap of intensity distributions in the first region and the second region.

4. The method of claim 1, wherein determining an overlap of intensity distributions includes computing a number of times a photometric value appears in the first region and the second region.

5. The method of claim 1, wherein the first and second images depict the same anatomy at different points in time.

6. The method of claim 5, wherein the anatomy is a heart, the first and third regions are a left ventricle cavity and the second and fourth regions are a myocardium.

7. The method of claim 6, wherein segmenting the second image includes generating a first curve that tracks an endocardium boundary and a second curve that tracks an epicardium boundary, wherein the curves are generated by minimizing functions that contain a coefficient based on the determined overlap of intensity distributions in the first region and the second region.

8. A system for tracking images comprising:
an input module configured to input a first image that has been segmented into a first region and a second region; and
a processor operably connected with the input module, wherein the processor is configured to determine an overlap of intensity distributions in the first region and the second region, and wherein the processor is configured to segment a second image into a third region and a fourth region such that an overlap of intensity distributions in the third region and the fourth region is substantially similar to the overlap of intensity distributions in the first region and the second region.

9. The system of claim 8, wherein the first image is segmented at least one of manually and automatically.

10. The system of claim 8, wherein the overlap of intensity distributions in the third region and the fourth region is the same as the overlap of intensity distributions in the first region and the second region.

11. The system of claim 8, wherein determining an overlap of intensity distributions includes computing a number of times a photometric value appears in the first region and the second region.

12. The system of claim 8, wherein the first and second images depict the same anatomy at different points in time.

13. The system of claim 12, wherein the anatomy is a heart, the first and third regions are a left ventricle cavity and the second and fourth regions are a myocardium.

14. The system of claim 13, wherein segmenting the second image includes generating a first curve that tracks an endocardium boundary and a second curve that tracks an epicardium boundary, wherein the curves are generated by minimizing functions that contain a coefficient based on the determined overlap of intensity distributions in the first region and the second region.

15. A computer-readable storage medium including a set of instructions for execution on a processing device and associated processing logic for tracking images, the set of instructions comprising:
a routine that allows the input of a first image that has been segmented into a first region and a second region;
a routine that allows determination of an overlap of intensity distributions in the first region and the second region; and
a routine that allows segmentation of a second image into a third region and a fourth region such that an overlap of intensity distributions in the third region and the fourth region is substantially similar to the overlap of intensity distributions in the first region and the second region.

16. The medium and instructions of claim 15, wherein the overlap of intensity distributions in the third region and the fourth region is the same as the overlap of intensity distributions in the first region and the second region.

17. The medium and instructions of claim 15, wherein determination of an overlap of intensity distributions includes computation of a number of times a photometric value appears in the first region and the second region.

18. The medium and instructions of claim 15, wherein the first and second images depict the same anatomy at different points in time.

19. The medium and instructions of claim 18, wherein the anatomy is a heart, the first and third regions are a left ventricle cavity and the second and fourth regions are a myocardium.

20. The medium and instructions of claim 19, wherein segmenting the second image includes generating a first curve that tracks an endocardium boundary and a second curve that tracks an epicardium boundary, wherein the curves are generated by minimizing functions that contain a coefficient based on the determined overlap of intensity distributions in the first region and the second region.

* * * * *